(12) United States Patent
Shanbhag et al.

(10) Patent No.: US 11,195,277 B2
(45) Date of Patent: Dec. 7, 2021

(54) SYSTEMS AND METHODS FOR GENERATING NORMATIVE IMAGING DATA FOR MEDICAL IMAGE PROCESSING USING DEEP LEARNING

(71) Applicant: GE Precision Healthcare LLC, Milwaukee, WI (US)

(72) Inventors: Dattesh Dayanand Shanbhag, Bangalore (IN); Arathi Sreekumari, Bangalore (IN); Sandeep Kaushik, Bangalore (IN)

(73) Assignee: GE Precision Healthcare LLC, Milwaukee, WI (US)

( * ) Notice: Subject to any disclaimer, the term of this patent is extended or adjusted under 35 U.S.C. 154(b) by 188 days.

(21) Appl. No.: 16/457,710

(22) Filed: Jun. 28, 2019

(65) Prior Publication Data
US 2020/0364864 A1   Nov. 19, 2020

(30) Foreign Application Priority Data
Apr. 25, 2019   (IN) .............................. 201941016418

(51) Int. Cl.
*G06T 7/00*   (2017.01)
*G06T 11/00*   (2006.01)

(52) U.S. Cl.
CPC .......... *G06T 7/0014* (2013.01); *G06T 11/008* (2013.01); *G06T 2207/10088* (2013.01); *G06T 2207/10104* (2013.01); *G06T 2207/10116* (2013.01); *G06T 2207/10132* (2013.01); *G06T 2207/20081* (2013.01); *G06T 2207/30008* (2013.01); *G06T 2207/30016* (2013.01); *G06T 2207/30096* (2013.01)

(58) Field of Classification Search
USPC ................................................. 382/128, 131
See application file for complete search history.

(56) References Cited

U.S. PATENT DOCUMENTS

| | | | | |
|---|---|---|---|---|
| 10,430,946 | B1* | 10/2019 | Zhou | G06N 3/0454 |
| 10,592,779 | B2* | 3/2020 | Madani | G06N 3/0481 |
| 10,852,379 | B2* | 12/2020 | Chen | G01R 33/4818 |
| 10,930,386 | B2* | 2/2021 | Syeda-Mahmood | G06K 9/4604 |

(Continued)

OTHER PUBLICATIONS

Schlegl et al., Unsupervised Anomaly Detection with Generative Adversarial Networks to Guide Marker Discovery, Mar. 17, 2017, arXiv: 1703.05921v1 [cs.CV], pp. 1-12 . (Year: 2017).*

(Continued)

*Primary Examiner* — Ishrat I Sherali

(57) ABSTRACT

Methods and systems are provided for generating a normative medical image from an anomalous medical image. In an example, the method includes receiving an anomalous medical image, wherein the anomalous medical image includes anomalous data, mapping the anomalous medical image to a normative medical image using a trained generative network of a generative adversarial network (GAN), wherein the anomalous data of the anomalous medical image is mapped to normative data in the normative medical image. In some examples, the method may further include displaying the normative medical image via a display device, and/or utilizing the normative medical image for further image analysis tasks to generate robust outcomes from the anomalous medical image.

13 Claims, 10 Drawing Sheets

(56) References Cited

U.S. PATENT DOCUMENTS

2019/0197358 A1* 6/2019 Madani ............... G06N 3/0481
2020/0085382 A1* 3/2020 Taerum ................ G06T 7/30
2020/0185084 A1* 6/2020 Syeda-Mahmood .......................
                                                            A61B 8/5223

OTHER PUBLICATIONS

Chen et al., Unsupervised Detection of Lesions in Brain MRI using Constrained adversarial auto-encoder, Jun. 13, 2018, arXiv: 1806.04972v1 [cs.CV], pp. 1-9. (Year: 2018).*
Madani et al., Chest x-ray generation and data augmentation for cardiovascular abnormality classification, Mar. 2, 2018, Proc. SPIE 10574, Medical Imaging, Image Processing, 105741M, doi: 10.1117/12.2293971 (Year: 2018).*
Costa et al., End-to-End Adversarial Retina Image Synthesis, Mar. 2018, IEEE Tranaction on Medical Imaging, vol. 37, No. 3, (Year: 2018).*
Clatz, O. et al., "Realistic Simulation of the 3D Growth of Brain Tumors in MR Images Coupling Diffusion with Biomechanical Deformation," IEEE Transactions on Medical Imaging, vol. 24, No. 10, Oct. 2005, 36 pages.
Goodfellow, I. et al., "Generative Adversarial Nets," Proceeding of the Advances in Neural Information Processing Systems 27 (NIPS 2014), Dec. 8, 2014, Montreal, Canada, 9 pages.
He, K. et al., "Deep Residual Learning for Image Recognition," Proceedings of the 2016 IEEE Conference on Computer Vision and Pattern Recognition (CVPR), Jun. 27, 2016, Available Online Dec. 10, 2015, Las Vegas, Nevada, 12 pages.
Ba, J. et al., "Layer Normalization," arXiv Website, Available Online at https://arxiv.org/abs/1607.06450, Jul. 21, 2016, 14 pages.
Zhu, J. et al., "Unpaired Image-to-lmage Translation using Cycle-Consistent Adversarial Networks," arXiv Website, Available Online at https://arxiv.org/abs/1703.10593, Nov. 15, 2018, Available Online Mar. 30, 2017, 18 pages.
Ulyanov. D. et al., "Instance Normalization: The Missing Ingredient for Fast Stylization," arXiv Website, Available Online at https://arxiv.org/abs/1607.08022, Nov. 6, 2017, Available Online at Jul. 27, 2016, 6 pages.
Shin, H. et al., "Medical Image Synthesis for Data Augmentation and Anonymization using Generative Adversarial Networks," arXiv Website, Available Online at https://arxiv.org/abs/1807.10225, Sep. 13, 2018, Available Online Jul. 26, 2018, 11 pages.

* cited by examiner

SYSTEMS AND METHODS FOR GENERATING NORMATIVE IMAGING DATA FOR MEDICAL IMAGE PROCESSING USING DEEP LEARNING

CROSS REFERENCE TO RELATED APPLICATIONS

The present application claims priority to Indian Patent Application No. 201941016418, entitled "SYSTEMS AND METHODS FOR GENERATING NORMATIVE IMAGING DATA FOR MEDICAL IMAGE PROCESSING USING DEEP LEARNING", filed on Apr. 25, 2019. The entire contents of the above-listed application are incorporated herein by reference for all purposes.

FIELD

Embodiments of the subject matter disclosed herein relate to generating normative imaging data for anomalous medical images using deep learning.

BACKGROUND

In the presence of pathologies such as non-infiltrating tumors (e.g. gliomas, Glioblastomas, etc.), the surrounding healthy tissue is compressed by the growing tumor. While considering therapy for these patients, and to study progress of tumor growth from a baseline state of the tissue, it may be helpful to know the brain structure prior to the presence of the tumor. A baseline non-pathological image of the patient also helps label the healthy surrounding tissue to spare critical functional regions during radiation therapy or surgery. Furthermore, in some deep learning applications, a neural network for performing certain task (e.g., scan plane segmentation) has been trained on "normal" data. Applying this model to "anomalous" data with, for example, lesion, might not produce ideal results. Current approaches to generate such baseline images include using detailed biomechanical models or registration-based inversion methods. However, these approaches rely on prior information about pathology location and must utilize region of interest delineation, which utilizes additional computing resources and time.

SUMMARY

The present disclosure at least partially addresses the issues described above by using Generative Adversarial Networks (GANs) for estimating normative data for a given set of anomalous data. In one embodiment, a method for generating a normative medical image from an anomalous medical image includes receiving an anomalous medical image, wherein the anomalous medical image includes anomalous data, mapping the anomalous medical image to a normative medical image using a trained generative network of a generative adversarial network (GAN), wherein the anomalous data of the anomalous medical image is mapped to normative data in the normative medical image, and displaying the normative medical image via a display device.

GANs may be useful for learning data style transfers since a GAN may implicitly model the parametric form of data distributions. In this way, the above approach relaxes the constraint on input and output data to be exactly matched for one-to-one correspondence, which addresses the difficulty of obtaining exactly matched data for cases where a pathology is present (e.g., as many pathologies cannot be predicted, scans may only be completed after the pathology is present, and no scans may be available when individual is healthy). Furthermore, the approaches described herein may utilize fewer computing resources, rely on less advance information (e.g., pathology location), and generate normative data more quickly than the prior approaches described above.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
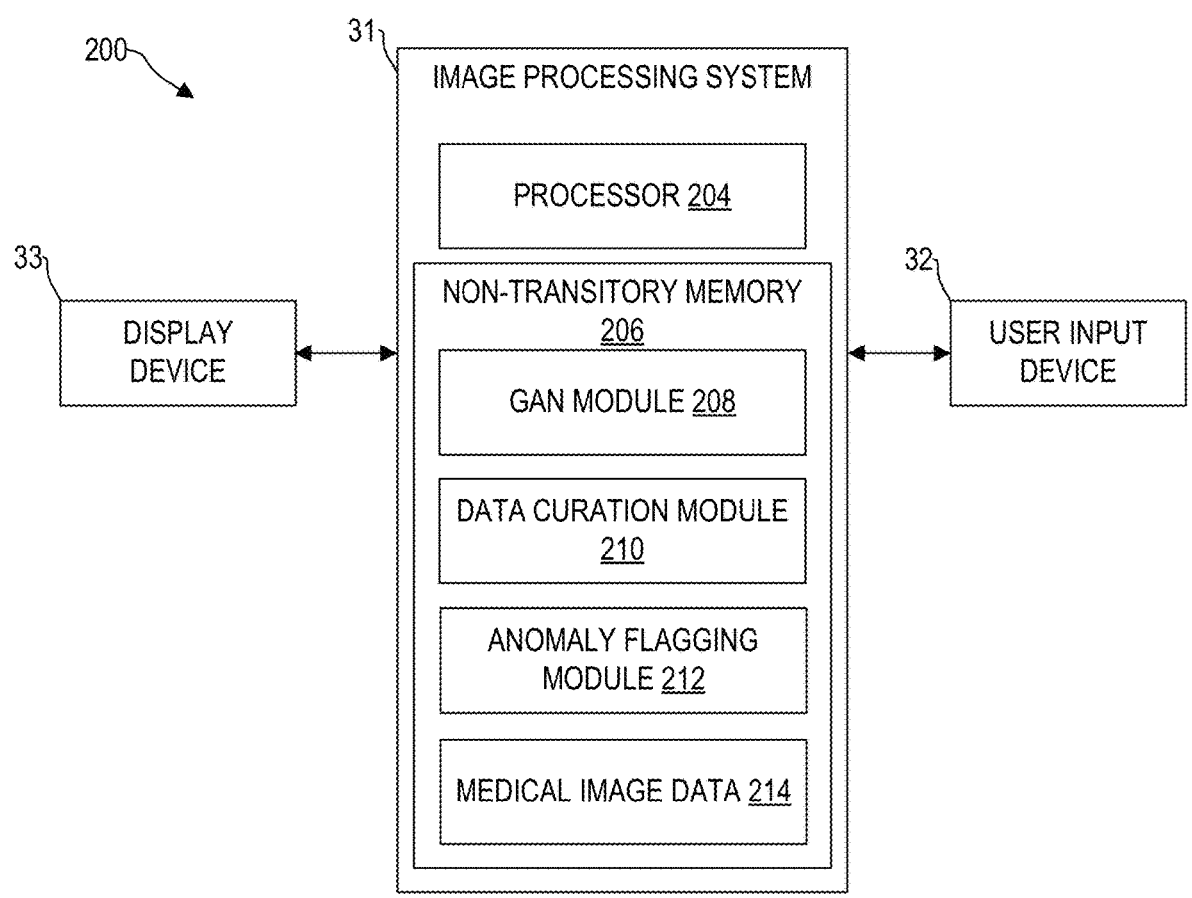
FIG. 1 shows an exemplary embodiment of an image processing system for processing medical images.

In the presence of pathologies such as non-infiltrating tumors (e.g., gliomas, Glioblastomas, etc.), healthy tissue surrounding the tumors is compressed by the growing tumor. While considering therapy for a patient with such one or more tumors, and to study progress of tumor growth from a baseline, it is useful to know the brain structure of the patient prior to the presence of the tumor(s). A baseline non-pathological medical image (e.g., a Magnetic Resonance (MR) image, computerized tomography (CT) image, positron emission tomography (PET) image, x-ray image, ultrasound image, etc.) of the patient also helps label the healthy surrounding tissue to spare critical functional regions during radiation therapy or surgery. Furthermore, many image analysis applications that are used to analyze medical images utilize models that are trained using non-anomalous data (e.g., non-pathological medical images). Accordingly, applying such a model on data affected by anomalies (e.g., pathologies, implants, image artifacts, etc.) may result in a substantial decrease in accuracy or performance of the image analysis relative to applying the model on normal data. A baseline image of an anatomical region of a patient that is affected by an anomaly may thus help to increase the accuracy and performance of such image analysis. However, such baseline images cannot be obtained directly via medical image scanning of the patient once the pathology is present. As many scans are only performed under suspicion of a pathological concern, it is also unlikely that a given patient with a pathology or other anomaly was scanned prior to the introduction of the anomaly.

The present disclosure at least partially addresses the above issues. Image processing system 200, shown in FIG. 1, receives medical images produced by medical devices, such as magnetic resonance (MR) imaging devices, computerized tomography (CT) imaging devices, positron emission tomography (PET) imaging devices, x-ray imaging devices, ultrasound imaging devices, etc., and executes method(s) disclosed herein for generating normative data corresponding to the received medical images. Image processing system 200 may be incorporated into or communicably coupled to a medical device, or may be configured to receive medical images from storage devices. Image processing system 200 may execute method 400 for mapping an anomalous medical image to a normative medical image using a generative network of a GAN shown in FIG. 3, method 500 for training a GAN using selected reference data shown in FIG. 4, and/or workflows 600 and 700 of FIGS. 5 and 6, respectively, illustrating examples of how the normative data generation methods of the current disclosure may be integrated into image processing workflows. Results of example normative data generation and/or downstream processing based on generated normative data are shown in FIGS. 7-10.

In this way, normative imaging data may be generated for a modality and protocol of interest using non-normative (e.g., anomalous) medical images. Since many applications are trained using normative data, such applications may be applied with a greater degree of accuracy, reliability, and overall performance using the generated normative imaging data in place of the original non-normative medical images, while still maintaining relevance to the subject of the original non-normative medical images.

Referring to FIG. 1, image processing system 200 is shown, in accordance with an exemplary embodiment. In some embodiments, image processing system 200 is incorporated into a medical device, such as MR, CT, x-ray, PET, ultrasound, etc. In some embodiments, image processing system 200 is disposed at a device (e.g., edge device, server, etc.) communicably coupled to the medical device via wired and/or wireless connections. In some embodiments, image processing system 200 is disposed at a separate device (e.g., a workstation) which can receive images from the medical device or from a storage device which stores the images generated by the medical device. Image processing system 200 may comprise image processing system 31, user input device 32, and display device 33.

Image processing system 31 includes a processor 204 configured to execute machine readable instructions stored in non-transitory memory 206. Processor 204 may be single core or multi-core, and the programs executed thereon may be configured for parallel or distributed processing. In some embodiments, the processor 204 may optionally include individual components that are distributed throughout two or more devices, which may be remotely located and/or configured for coordinated processing. In some embodiments, one or more aspects of the processor 204 may be virtualized and executed by remotely-accessible networked computing devices configured in a cloud computing configuration.

Non-transitory memory 206 may comprise Generative Adversarial Network (GAN) module 208, data curation module 210, anomaly flagging module 212, and medical image data 214. GAN module 208 includes instructions for transforming non-normative (anomalous) medical image data (e.g., anomalous medical image data comprising pathologies, image artifacts, implants, and/or otherwise impaired or distorted medical image data) into normative image data, which resembles medical image data captured from imaging healthy individuals. The GAN module 208 may operate using deep learning and/or other machine learning/artificial intelligence mechanisms. The data curation module 210 includes instructions for intelligently selecting reference data that is similar to a given anomalous medical image(s) and is devoid of anomalies/anomalous data, as will be described in more detail below with respect to FIG. 2.

Anomaly flagging module 212 is optionally included in image processing system 200 and includes instructions for identifying that a medical image includes an anomaly that renders the image non-normative and generating a flag for the image responsive thereto. For example, the anomaly flagging module may be configured to detect anomalies such as a pathology (e.g., a tumor), an implant (e.g., a foreign object present in the imaged portion of the individual, and/or an image artifact that obscures at least a portion of an image. In some examples, the detection performed by the anomaly flagging module 212 may be automatic (e.g., based on analyzing the image for the anomaly). In other examples, the detection performed by the anomaly flagging module 212 may be based on user input that indicates that an image includes an anomaly. The flag generated by the anomaly flagging module 212 may include a bit or string associated with a given image that is set to a value corresponding to an anomalous image when an anomaly is identified in the given image. The bit or string may be set to a different value corresponding to a non-anomalous image when an anomaly is not identified. In some examples, the anomaly flagging module 212 may optionally include further instructions for identifying and providing information regarding the anomaly, such as a type, size, location, etc. When included, the anomaly flagging module may reduce compute time for images by only sending anomalous images for further processing (e.g., to avoid attempting to generate a normative image for an image that does not include an anomaly). In other examples, the anomaly flagging module may not be included in the image processing system, such as examples where it is understood that data is being collected from a specific cohort of diseased subjects.

The medical image data 214 includes a portion of the non-transitory memory that stores and/or is allocated to store medical image data, such as MR, CT, x-ray, PET, and/or ultrasound images. For example, the medical image data 214 may store non-normative and normative medical images that are captured from a medical device as well as normative medical images generated by the GAN module 208 using the non-normative medical images and the reference data selected by the data curation module 210.

In some embodiments, the non-transitory memory 206 may include components disposed at two or more devices, which may be remotely located and/or configured for coordinated processing. In some embodiments, one or more aspects of the non-transitory memory 206 may include remotely-accessible networked storage devices configured in a cloud computing configuration.

Image processing system 200 may further include user input device 32. User input device 32 may comprise one or more of a touchscreen, a keyboard, a mouse, a trackpad, a motion sensing camera, or other device configured to enable a user to interact with and manipulate data within image processing system 31. In one example, user input device 32 may enable a user to make a selection of an intensity threshold, or intensity range, such as by interacting with an intensity threshold control interface which may be displayed via display device 33.

Display device 33 may include one or more display devices utilizing virtually any type of technology. In some embodiments, display device 33 may comprise a computer monitor, and may display unprocessed and processed medical images. Display device 33 may be combined with processor 204, non-transitory memory 206, and/or user input device 32 in a shared enclosure, or may be peripheral display devices and may comprise a monitor, touchscreen, projector, or other display device known in the art, which may enable a user to view medical images produced by a medical device, and/or interact with various data stored in non-transitory memory 206.

It should be understood that image processing system 200 shown in FIG. 1 is for illustration, not for limitation. Another appropriate image processing system may include more, fewer, or different components. For example, in some embodiments, selecting reference data and/or identifying anomaly can be done manually and thus, data curation module 210 and/or anomaly flagging module 212 can be omitted.

Figure 2:
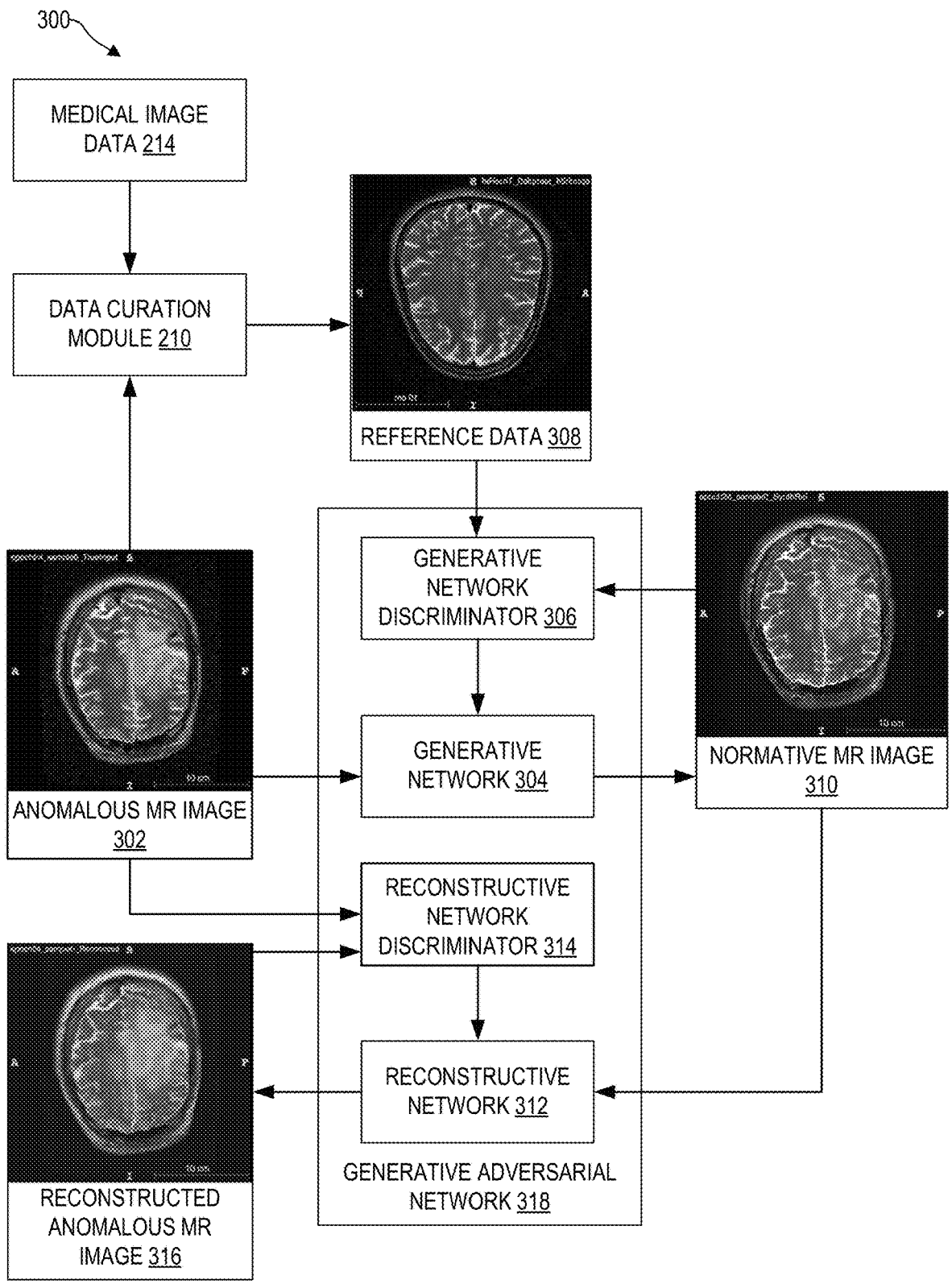
FIG. 2 shows an example block diagram of a normative data generation system including a generative network.

Turning to FIG. 2, a normative data generation system 300 for mapping anomalous medical images to normative medical images is shown. Although MR images are used as an example herein for illustration, it should be understood that the system described can be applied to other modalities, such as CT, X-ray, PET, ultrasound, etc. In one embodiment, normative data generation system 300 is implemented by an image processing system, such as image processing system 31. Normative data generation system 300 is configured to generate normative medical images, such as normative MR image 310, from input anomalous medical images, such as anomalous MR image 302, by mapping anomalous data to normative, anatomical data using neural network models trained via an adversarial approach. GAN 318 includes a first generator/discriminator pair, including generative network 304 and generative network discriminator 306, which are configured to map anomalous medical images to normative medical images. GAN 318 further includes a second generator/discriminator pair, including reconstructive network 312 and reconstructive network discriminator 314, which are configured to reconstruct input, anomalous medical images using output, normative medical images, thereby enabling determination of cycle consistency losses. In some embodiments, GAN 318 may be stored as machine executable instructions within GAN module 208 of image processing system 31. In an exemplary embodiment, normative data generation system 300 is configured to map anomalous medical images to normative medical images by executing one or more operations of one or more methods herein disclosed.

Normative data generation system 300 may be configured to receive anomalous medical images, such as anomalous MR image 302. The MR image 302 may be any appropriate contrast, such as T1-weighted, T2-weighted scans, T1-FlAIR, T2-FLAIR, proton density-weighted, etc. Anomalous MR image 302 may include one or more anomalous regions corresponding to non-anatomical or abnormal anatomical regions. Non-anatomical or abnormal regions may include pathologies, such as tumors, lesions, cysts, or deformed tissue/anatomical structures etc., or non-pathological anomalies, such as implants, intrusions, or image artifacts. In the embodiment of normative data generation system 300 shown in FIG. 2, anomalous MR image 302 includes an anomalous region corresponding to a brain tumor.

Normative data generation system 300, in response to receiving anomalous MR image 302, may transit anomalous MR image 302 to data curation module 210. Data curation module 210 is configured to extract one or more attributes of anomalous MR image 302, and match the extracted attributes to a plurality of non-anomalous MR images, stored in medical image data 214. In some embodiments, the extracted attributes may comprise an anatomical feature (e.g., a type of anatomical feature and/or a shape and/or gradient of the anatomical feature and/or image), a medical image contrast, a slice depth, or other attributes not including attributes associated with anomalous data. Data curation module 210 may in some embodiments comprise a neural network, trained to identify one or more attributes of a received image. In some embodiments, data curation module 210 may read in metadata relating to anomalous MR image 302, and may select MR images from medical image data 214 based on the read in metadata. Data curation module 210 may, in response to extraction of one or more attributes from a received medical image, compare the one or more extracted attributes with attributes of one or more of a plurality of non-anomalous medical images stored within medical image data 214. Data curation module 210 may select non-anomalous MR images from medical image data 214 which share one or more attributes with anomalous MR image 302. In one embodiment, data curation module 210 may select a non-anomalous MR image from medical image data 214 in response to the non-anomalous MR image comprising one or more anatomical features/structures also present in anomalous MR image 302. In some embodiments, data curation module 210 may select MR images from medical image data 214 which share more than a threshold number of attributes with anomalous MR image 302.

Reference data 308 comprises MR image data of healthy/non-anomalous anatomical features which is substantially similar in appearance to anomalous MR image 302. Non-anomalous MR images selected by data curation module 210 from medical image data 214, based on attributes extracted from anomalous MR image 302, make up reference data 308. In other words, reference data 308 is a subset of MR images from medical image data 214, selected based on a filter defined by data curation module 210 in response to one or more extracted attributes of anomalous MR image 302. Although reference data 308, as shown in FIG. 2, includes only a single MR image, it is to be appreciated that reference data 308 may comprise any appropriate number of MR images. Reference data 308 is used in conjunction with output of generative network 304, such as normative MR image 310, to train generative network discriminator 306. In some embodiments, the reference data 308 may be selected manually.

Generative network discriminator 306 is configured to distinguish between normative MR image 310 and reference data 308. Generative discriminator 306 may comprise a neural network classifier, trained to classify a received medical image as "real" (that is, a medical image devoid of synthesized data and/or originating from reference data 308) or "fake" (that is, a medical image including synthesized data and/or comprising output of generative network 304, such as normative MR image 310). In some embodiments, generative discriminator 306 may comprise 70×70 Patch-GANs which are configured to classify a 70×70 patch of pixels of an input image as either "real" or "fake" in a convolutional manner. Patch-level discrimination enables the discriminator to classify arbitrarily sized images, in a computationally efficient manner, without relying on a large number of features. The parameters (weights and biases) of the generative network discriminator 306 are learned/optimized according to a gradient descent algorithm, which in one embodiment includes back propagation, using reference data 308 and output of generative network 304, such as normative MR image 310. The parameters of the generative network discriminator 306 are adjusted to maximize the probability that an input medical image will be correctly classified as "real" if the input medical image originates from reference data 308, or "fake" if the input medical image originates from generative network 304. Thus, the function of the generative network discriminator 306 is to discriminate or distinguish between medical images from reference data 308, which are devoid of synthesized data, and normative medical images produced by generative network 304, such as normative MR image 310.

Training data for the generative network discriminator 306 includes image/classification pairs, including either a medical image from reference data 308 with a corresponding classification of "real", or a medical image generated by generative network 304, such as normative MR image 310, with a corresponding classification of "fake." For a given medical image input into generative network discriminator 306, a correct result comprises producing a classification which matches the corresponding classification of the medical image, and an incorrect result comprises producing a classification which does not match the corresponding classification of the medical image. In other words, the cost function for use in training the generative network discriminator 306 is based on the classification produced by the generative network discriminator 306 matching the correct classification for each medical image of the training data. Output of the generative network discriminator 306 is used to train the generative network 304, and output from the generative network 304 is used to train the generative network discriminator 306, enabling the performance of the generative network 304 and generative network discriminator 306 to be successively improved in an iterative fashion (see the below description of FIG. 4 for a more detailed discussion).

Generative network 304 comprises a convolutional neural network, configured to receive medical image data at a plurality of input nodes of an input layer, and map the medical image data to output data by propagating the medical image data from the input layer, through one or more convolutional layers, to an output layer. Propagation of data from one layer to the next is controlled by learned parameters of the generative network 304, wherein the learned parameters comprise weights and biases. In some embodiments, generative network 304 includes stride-2 convolutions, and fractionally strided convolutions (with stride of ½).

Parameters of generative network 304, and associated generative network discriminator 306, may be learned via an adversarial machine learning scheme, wherein weights and biases of the generative network 304 are adjusted based on output of generative network discriminator 306, and where weights and biases of generative network discriminator 306 are adjusted based on output of generative network 304 and further based on reference data 308. In some embodiments, parameters of generative network 304 may be learned using a gradient descent algorithm, such as backpropagation, based on a cost function, wherein the cost function is determined based on output from generative network discriminator 306. Parameters of generative network 304 may be considered optimized under the current conditions when the number of normative medical images generated by generative network 304, and classified incorrectly by generative network discriminator 306, is maximized (for fixed parameters of the generative discriminator).

GAN 318 is also configured to map normative medical images generated by generative network 304, such as normative MR image 310, to anomalous medical images using reconstructive network 312, thereby enabling cyclic mapping of medical images (that is, mapping a first anomalous medical image to a normative medical image, followed by mapping of the normative image to a second anomalous medical image, or vice versa). In FIG. 2, normative data generation system 300 maps anomalous MR image 302 to normative MR image 310, via generative network 304, and normative MR image 310 is mapped to reconstructed anomalous MR image 316 via reconstructive network 312. Cyclic mapping enables determination of a cycle consistency loss, a measure of the deviations in a medical image incurred by cyclically mapping a medical image. Training GAN 318 to reduce cycle consistency loss by tuning hyper parameters of one or more networks therein may increase the probability that anomalous medical images mapped to normative medical images retain a threshold amount of anatomical consistency, reducing the likelihood that normative medical images produced by generative network 304 include deviations in anatomical features outside of the one or more anomalous regions within the original anomalous medical image. Or in other words, tuning GAN 318 by adjusting one or more hyper parameters to reduce cycle consistency loss may enable selective mapping of anomalous regions of an input medical image to anatomical features, without distortion of non-anomalous regions of the input medical image.

Reconstructive network 312 and reconstructive network discriminator 314 are analogous to generative network 304, and generative network discriminator 306, respectively, and may therefore comprise similar, or the same, overall architecture. Briefly, reconstructive network 312 comprises a convolutional neural network, configured to receive normative medical image data at a plurality of input nodes of an input layer, and map the normative medical image data to anomalous medical image data by propagating the normative medical image data from the input layer, through one or more convolutional layers, to an output layer. Propagation of data from one layer to the next is controlled by learned parameters of the reconstructive network 312, wherein the learned parameters comprise weights and biases. In some embodiments, reconstructive network 312 includes stride-2 convolutions, and fractionally strided convolutions (with stride of ½).

Reconstructive network discriminator 314 and reconstructive network 312 represent a generator/discriminator pair, which may undergo adversarial machine learning, as discussed above with reference to generative network 304 and generative network discriminator 306. Briefly, reconstructive network discriminator 314 may be trained to distinguish between anomalous medical images, such as anomalous MR image 302, and reconstructed anomalous medical images, such as reconstructed anomalous MR image 316, via gradient descent. Subsequently, reconstructive network 312 may be trained to maximize the number of reconstructed anomalous medical images misidentified as anomalous medical images by reconstructive network discriminator 314 by producing reconstructed anomalous medical images including features similar to those of the original anomalous medical image.

Thus, the normative data generation system 300 of FIG. 2 may enable a medical image including one or more anomalies, to be mapped to a normative medical image, wherein one or more regions of the normative medical image corresponding to the one or more anomalies in the input image, comprise synthesized anatomical feature data. Further, inclusion of reconstructive network 312 and reconstructive network discriminator 314 enables reduction in the cycle consistency loss, and thereby reduction in the probability that one or more anatomical features present in an anomalous medical image will be distorted via the mapping performed by the generative network 304.

Figure 3:
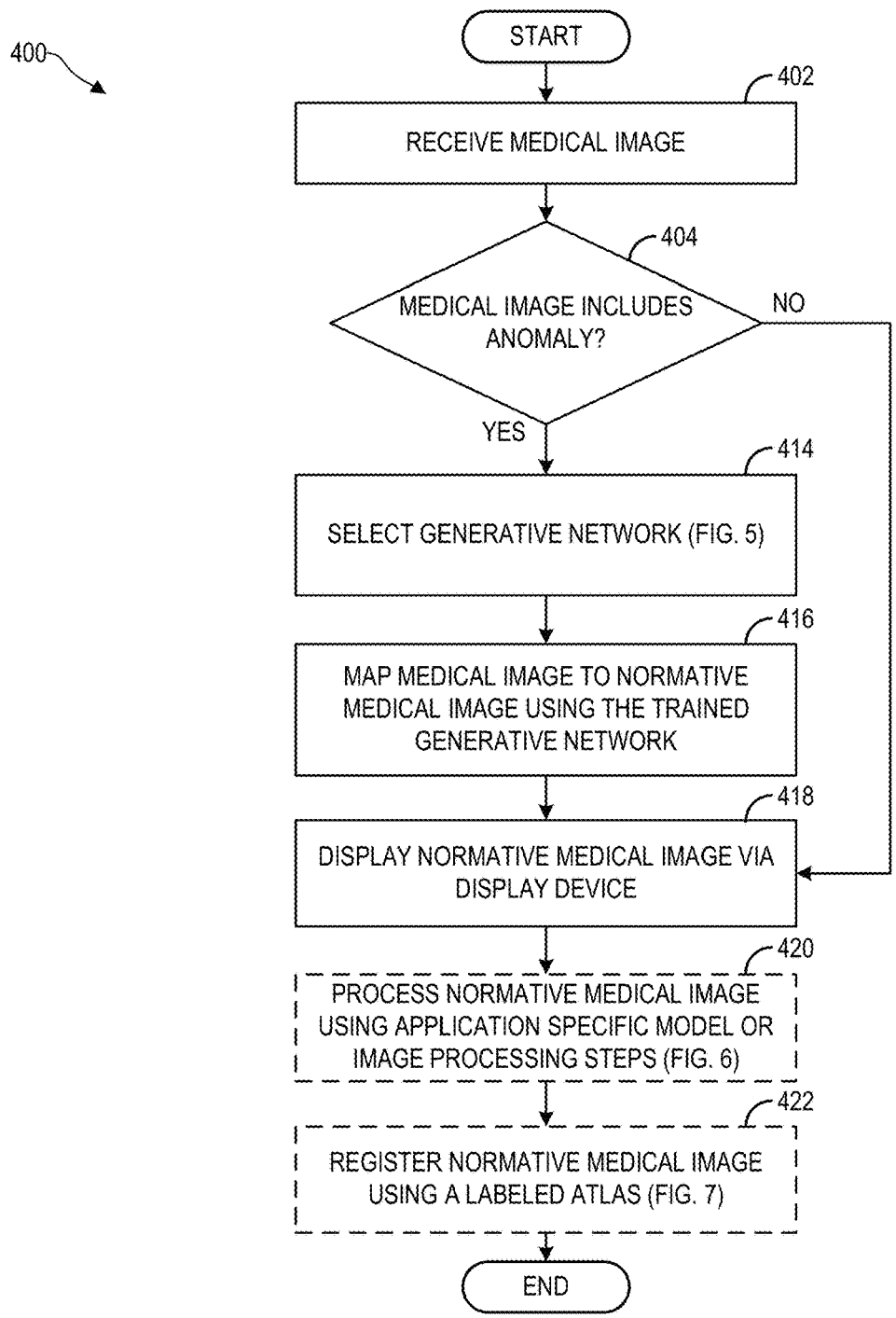
FIG. 3 shows a flow chart of an example method for generating normative data from a medical image using a generative network and optionally further processing the normative data.

FIG. 3 shows a flow chart of an example method 400 for generating normative data relating to a medical image. For example, method 400 may be performed using the components of normative data generation system 300 as described above with respect to FIG. 2. At 402, the method includes receiving a medical image. In some examples, the medical image may be received from an MRI system and may include MR images, MR parametric maps, and/or other image data of anatomical features of a patient. In other examples, the medical image may be received from an imaging system using a different imaging modality, such as a CT scanning system, an x-ray system, and/or an ultrasound system.

At 404, the method includes determining if the medical image includes an anomaly/anomalous data. Examples of anomalies may include pathologies (e.g., tumors or other pathological growths and/or abnormal anatomical features), implants (e.g., non-biological objects in the body), image artifacts (e.g., improper contrast levels, corrupted image data, etc.), deformations (e.g., compressed or otherwise topologically transformed anatomical features, such as compressed tissue surrounding a non-intrusive tumor) and/or other features that cause obstruction or alteration of anatomy captured by the medical image. In one embodiment, a medical image received at 402 may include an anomaly flag, indicating the medical image includes anomalous image data, and therefore, at 404 determining if the received medical image includes an anomaly may include determining if the received medical image includes an anomaly flag. In another embodiment, determining if the medical image includes an anomaly includes inputting the received image into a trained classifier, wherein the classifier comprises a neural network trained to classify input images as anomalous or non-anomalous, and based on output of the classifier indicating the input image includes anomalous data, concluding that the received medical image includes an anomaly. In some embodiments, the classifier may comprise a convolutional neural network trained using input medical images of either anomalous or non-anomalous data, with corresponding classifications. If the medical image does not include an anomaly (e.g., "NO" at 404), the method proceeds to display the received medical image as a normative medical image via the display device, as indicated at 418 (e.g., without transforming the received medical image).

In one embodiment, if the medical image is determined to include an anomaly (e.g., "YES" at 404), the method includes selecting a trained generative network (e.g., generative network 304 of FIG. 2), as indicated at 414. For example, step 414 may include selection of a pre-trained generative network based on one or more attributes of the medical image matching one or more attributes of reference data used to train a generative network discriminator and the generative network. In one example, there may be different generative networks trained for different anatomies (e.g., brain, knee, etc.), and based on the medical image comprising a brain pathology, a pre-trained generative network, trained using brain reference images, may be selected. In another example, if the medical image comprises an image of a knee, a pre-trained generative network, trained using brain reference images, may be selected.

In an another embodiment, if the medical image is determined to include an anomaly (e.g., "YES" at 404), the method includes training a generative network discriminator using reference data selected based on the medical image, and training an associated generative network using the generative network discriminator. In one example, reference data may be selected for training of the generative network discriminator which shares one or more attributes with the medical image, wherein the attributes may comprise a similar depth, anatomical feature, contrast, etc.

Figure 4:
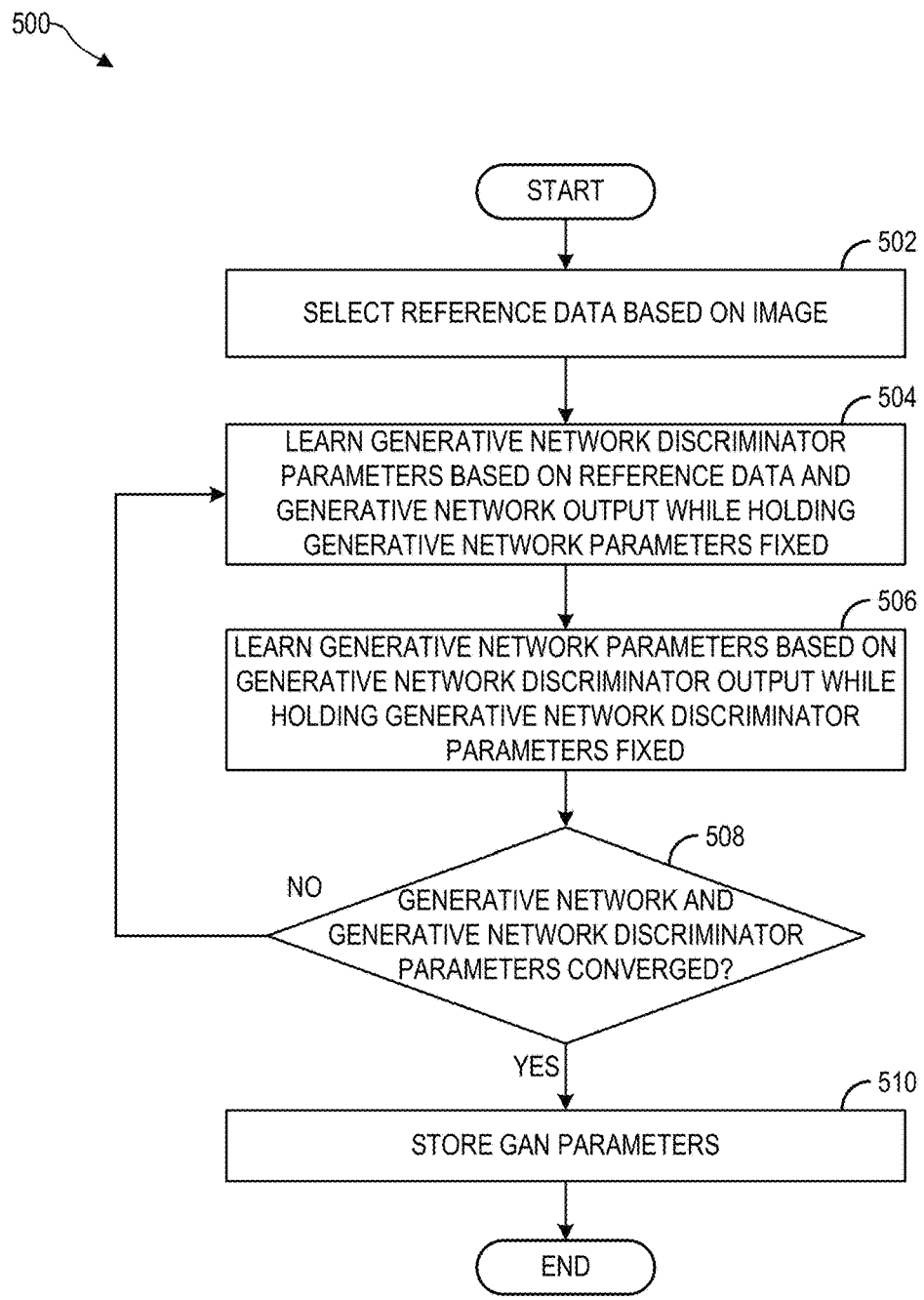
FIG. 4 shows a flow chart of an example method for training a generative network to generate normative data from anomalous medical images.

Turning briefly to FIG. 4, an example method 500 for training the selected generative network discriminator and generative network is shown. At 502, the method includes selecting reference data based on the received medical image. For example, as described above with respect to the data curation module 210 of FIGS. 1 and 2, reference data may be intelligently selected which shares features or attributes with the received medical image (e.g., the medical image received at 402 of FIG. 3 and/or a medical image that shares attributes with the medical image received at 402 of FIG. 3). In other words, from a pool of medical images, medical images sharing one or more, or in some embodiments, greater than a threshold number, of attributes with the received medical image may be selected as reference medical images to train a generative network discriminator. In one embodiment, reference data may be selected by a data curator, such as data curator 210, which may apply one or more filters to a plurality of stored medical images, thereby obtaining a subset of the pool of medical images meeting one or more criterion. In one example, the one or more criterion may include the reference data sharing one or more attributes with the medical image received at 502. Although herein described as occurring responsive to a determination that a received medical image includes an anomaly, it will be appreciated that the operations of selecting reference data based on a received medical image, and training a generative network discriminator and generative network using the selected reference medical images, may occur at other times. For example, selecting reference data and training the generative network discriminator and generative network may occur before a medical image is received, thereby enabling more rapid processing of received medical images using pre-trained GANs. Once reference data is selected at 502, method 500 may proceed to 504.

At 504, the method includes learning generative network discriminator parameters based on reference data and generative network output while holding generative network parameters fixed. In one example, back propagation of error associated with a cost function may be used to adjust the parameters (weights and biases) of a generative network discriminator in order to maximize classification of normative medical images produced by an associated generative network as "fake." By holding the parameters of the generative network fixed, the parameters of the generative network discriminator may stably converge.

At 506, the method includes learning generative network parameters based on generative network discriminator output while holding generative network discriminator parameters fixed. In one example, back propagation of error associated with a cost function may be used to adjust the parameters (weights and biases) of a generative network in order to minimize classification of normative medical images produced by an associated generative network as "fake." By holding the parameters of the generative network discriminator fixed, the parameters of the generative network may stably converge. Thus, steps 504 and 506 comprise alternate phases of learning, wherein at 504, the parameters of a generative network discriminator are adjusted to maximize the number of correctly classified medical images in a training data set (classified by the generative discriminator), wherein the training data set includes medical images including synthesized data (produced by a generative network) and medical images devoid of synthesized data (not produced by a generative network). Conversely, at 506, parameters of a generative network are adjusted to minimize the number of correctly classified medical images in a training data set (classified by the generative discriminator).

At 508, the method includes determining if the generative network and generative network discriminator parameters converged. If the parameters have not yet converged (e.g., "NO" at 508), the method includes returning to 504 to perform another iteration of parameter learning for the generative network discriminator and generative network. Once the parameters have converged (e.g., "YES" at 508), the method includes storing the generative adversarial network (GAN) parameters, as indicated at 510. In one embodiment, parameter convergence may be concluded responsive to a rate of change of one or more, or all GAN parameters decreasing to below a threshold, wherein the rate of change of a parameter is measured on a per iteration basis (that is wherein the difference between a first parameter in an $n^{th}$ iteration of step 504 of method 500 and an $(n+1)^{th}$ iteration is referred to as a rate of change for the first parameter). For example, the stored parameters may define a trained GAN, which may be used in a later iteration of method 400 for generating normative image data for a similar image (e.g., a similar medical image to the image used to select the reference data at 502). It should be understood that method 500 shown in FIG. 4 is for illustration, not for limitation. Another appropriate method may include more, fewer, or different operations.

Returning to FIG. 3, the method includes mapping the medical image to a normative medical image using the trained generative network that is selected at 414 (e.g., trained according to method 500 of FIG. 4). For example, the medical image may be input into the trained generative network (e.g., an example of generative network 304 of FIG. 2 after training is complete), which may output a corresponding normative medical image. In one embodiment, the output, normative medical image, may comprise one or more regions of inferred/synthesized data, replacing one or more corresponding regions of anomalous data in the received medical image. After mapping the medical image to the normative medical image, the method includes displaying the mapped normative medical image via the display device, as indicated at 418.

Once a normative medical image is generated (or if the received medical image is already determined to be free of anomalies and thus normative), the method may include performing additional processing on the medical image, including processing that is tuned for application to normative data. For example, at 420, the method optionally includes processing the normative medical image with application specific steps: such as additional deep learning networks or image processing and analytics steps to achieve the task of interest. An example of such processing is described in more detail below with respect to FIG. 5. At 422, the method additionally or alternatively optionally includes registering the normative medical image using a labeled atlas. An example of performing image registration on normative medical images is described below with respect to FIG. 6. It should be understood that method 400 shown in FIG. 3 is for illustration, not for limitation. Another appropriate method may include more, fewer, or different operations.

Figure 5:
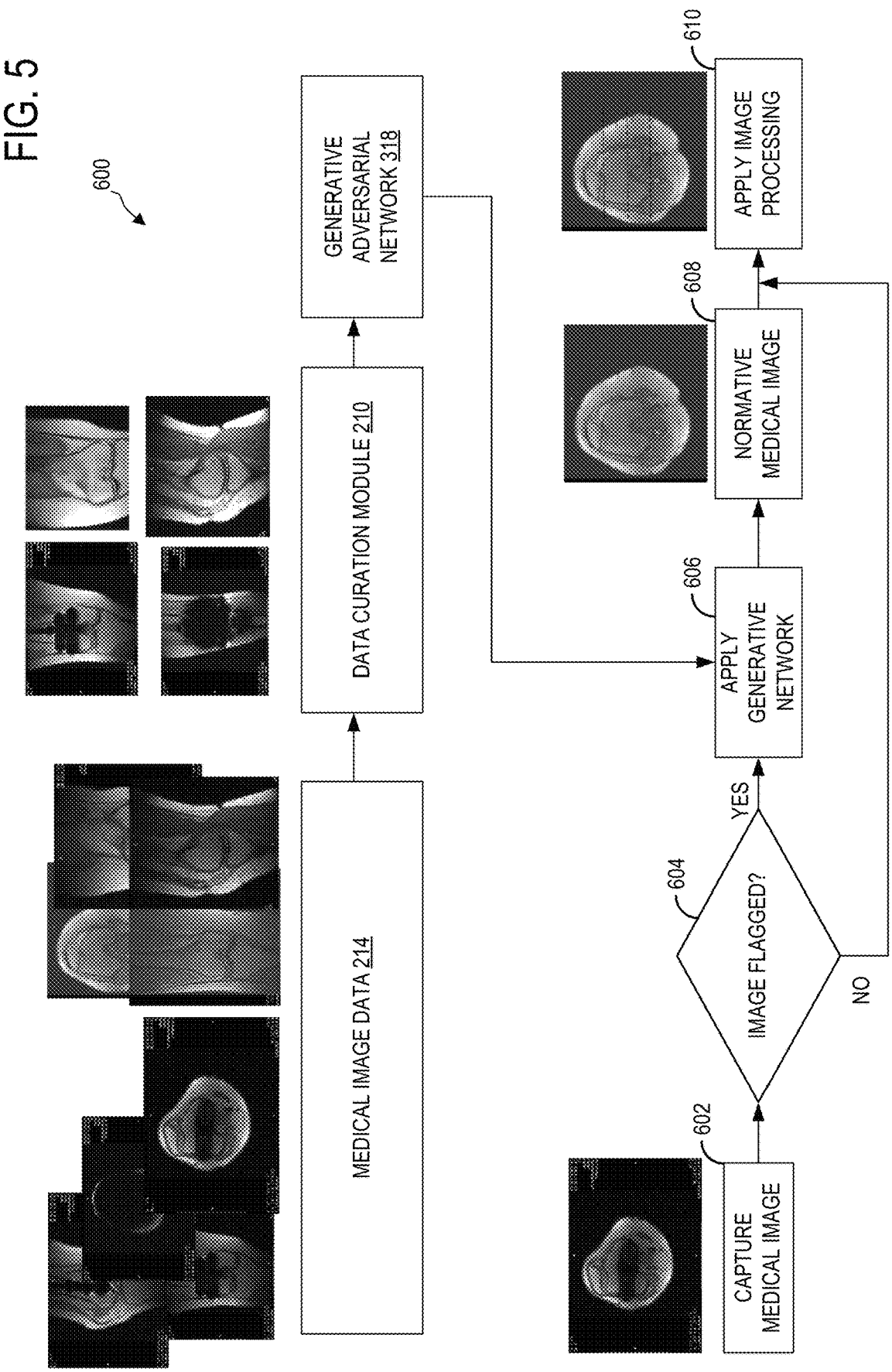
FIG. 5 shows an example workflow for synthesizing normative data from an anomalous medical image of a knee.

Turning to FIG. 5, an example workflow 600 for synthesizing normative data from an anomalous MR image of a knee is shown. Workflow 600 enables more robust downstream image processing, particularly in image processing workflows using machine learning models trained using predominately non-anomalous data. Anomalous data may occur less frequently than non-anomalous data in training data sets, an issue known as data imbalance. Therefore, image processing models may perform better on normative data, than on anomalous data, as these models may be trained using data that comprises a relatively small portion of anomalous data and a relatively large portion of non-anomalous data. Workflow 600 may address the issue of imbalanced training data by ensuring that anomalous data is converted to normal data before being input into a model trained using predominately non-anomalous data. MR images related to one or more components or steps of workflow 600 may be shown above the relevant component/step. Although MR images are used herein as an example for illustration, it should be understood that the workflow 600 can be applied to other modalities, such as CT, x-ray, PET, ultrasound, etc.

Workflow 600 begins at 602, where a new MR image is captured. At 602, a captured MR image may be evaluated to determine if the captured MR image includes an anomaly. In some embodiments, anomaly identification may be carried out at 602 by a neural network classifier, trained on anomalous MR image data. Responsive to a determination that a captured MR image includes an anomaly, operation 602 may further include flagging the captured MR image with an anomaly flag. In some embodiments, the anomaly flag may comprise one or more details regarding the one or more anomalies included within the captured MR image. In the instance depicted by workflow 600, the knee section captured at operation 602 includes a knee slice affected due to presence of metal in knee (e.g., primarily due to use of surgical screws, fixtures, and/or other implants). Workflow 600 may then proceed to 604.

At 604 of workflow 600, it is determined if the captured image includes an anomaly flag. In some embodiments, an anomaly flag may be included within the metadata of a captured MR image. Responsive to an indication at 604 that the captured image does not include an anomaly flag, workflow 610 may proceed to operation 610, where downstream image processing is carried. However, if at 604 it is determined that the captured image includes an anomaly flag, workflow 600 proceeds to operation 606.

At 606, workflow 600 includes applying a generative network based on the captured image. Briefly, operation 606 in the embodiment shown in FIG. 5 applies a generative network that is trained by a process in which the data curation module 210 selects a subset of MR image data stored in medical image data 214 based on one or more attributes of the captured MR image. Specifically, in the example shown in FIG. 5, data curation module 210 may select MR images including similar anatomical features, and/or by matching image metadata included within medical image data 214 with the metadata of the captured MR image. The MR images selected by data curation module 210 from medical image data 214 are then used as reference data in the training of GAN 318, as discussed in more detail in the description of FIG. 4. Once GAN 318 is trained, operation 606 includes applying the generative network of GAN 318 to the captured image. Workflow 600 may then proceed to 608.

At 608, workflow 600 includes outputting from the generative network a normative MR image corresponding to the captured MR image. The normative MR image of operation 608 includes synthesized anatomical structure/features in place of the anomalies in the original captured image. Workflow 600 may then proceed to 610.

At 610, workflow 600 includes inputting the normative MR image into an image processing model, in some embodiments, the image processing model was trained using non-anomalous training data. Non-anomalous training data refers to MR images devoid of pathologies, implants, image artifacts, and other non-anatomical features. In some embodiments, the image processing model of operation 610 may include a neural network based segmentation algorithm, which may distinguish between foreground and background of an MR image for purposes of background noise reduction. In other embodiments the image processing model of operation 610 may include additional processing to determine the different imaging planes (e.g., for a knee image, the planes may include the meniscus plane, the anterior cruciate ligament plane, etc.) to acquire landmark/structure continuity and therefore consistent image quality.

In this way, workflow 600 may enable use of downstream image processing, using machine learning models trained via non-anomalous data, which may otherwise be incompatible with MR images including anomalies. Thereby greatly increasing the utility of such downstream image processing tools.

Figure 6:
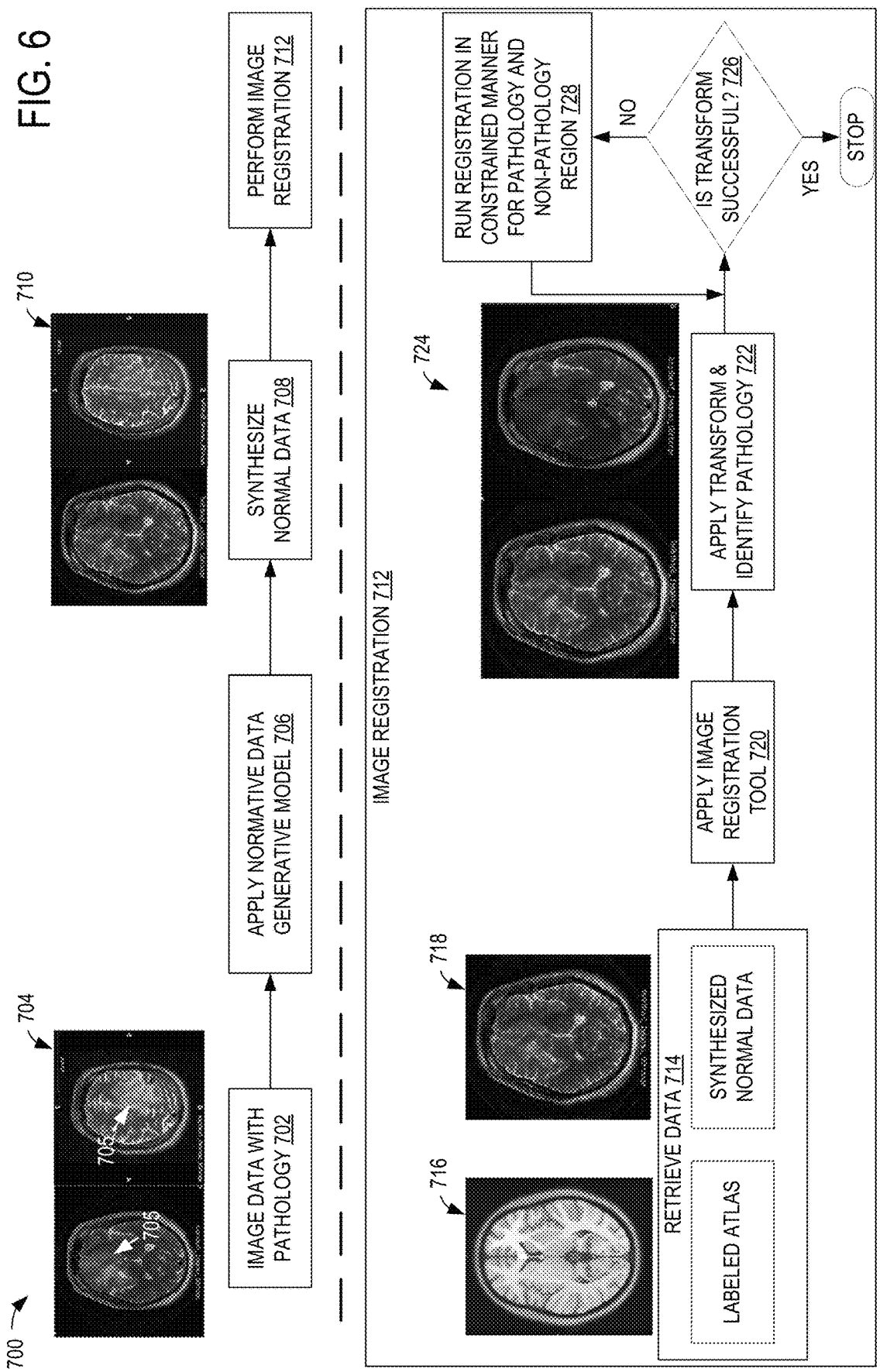
FIG. 6 shows an example workflow for synthesizing normative data from an anomalous medical image of a brain and performing image registration on the normative data.

FIG. 6 shows an example workflow 700 for an image registration application to be applied to a normative MR image. Although MR images are used herein as an example for illustration, it should be understood that the workflow 700 can be applied to other modalities, such as CT, x-ray, PET, ultrasound, etc. The image registration described in workflow 700 may be performed to provide a registration between data affected with pathology (also called a moving image) and an atlas (e.g., a mapping for an associated anatomical region or feature, also called a reference image). The process of registration comprises determining the displacement vector at each pixel in the moving image, and minimizing the sum of all displacement vectors for a moving image by adjusting the position of the moving image relative to the reference image, to achieve a close fit between the moving image and reference image. The displacement vector at each pixel over the image volume is referred to as the deformation field. Since atlases are typically based on normal data (e.g., data for non-pathological anatomy), any presence of pathology or anomalies in an input image (moving image) will result in poor registration results and impact registration even in regions of the image that are not affected by a pathology or anomaly. Accordingly, using synthetic normative data improves the initial registration of normal tissue structures with the atlas, and the results for the pathology image may be further refined using an initial deformation field. The normative data may also be used to determine the anomaly map (e.g., pathology region in the image) by correlating the normative and pathology images in a patch-by-patch manner or subtraction of these. This anomaly map may be used to do further constrained registration in regions affected by pathology.

The workflow 700 thereby includes an initial stage of generating normative data, followed by an application of image registration using the normative data. The normative data generation described with reference to workflow 700 may be performed similarly to the normative data generation described above with respect to FIGS. 2-5. At 702, the workflow includes imaging data with a pathology present. Example images resulting from such pathological imaging are shown at 704 (e.g., including tumors indicated by arrows 705). As indicated at 706, a normative data generative model is applied to the pathological image data. For example, a generative model formed by a generative adversarial network (GAN), such as GAN 318 of FIG. 2, may be applied to the pathological image data in order to effectively remove or decrease the appearance of the pathologies in the image data. Accordingly, at 708, normative data is synthesized for the pathological image data. Examples of normative data are shown at 710, where the normative data appears similar to the input pathological data in regions where the pathology was not present and where normative data replaces the pathology with estimated normal data based on the application of the normative data generative model. As the synthesized normal data reduces the appearance of the pathology in the input images while still maintaining a correspondence to the original image in non-pathological regions of the image, the synthesized normal data may be used to perform image registration, as indicated at 712, without incurring the difficulties outlined above when attempting to perform image registration with non-normative data.

An example of the workflow for performing image registration is also shown in FIG. 6. At 714, the workflow includes retrieving data for image registration, the data including a labeled atlas (an example of which is shown at 716) and the normative data synthesized at 708 (an example of which is shown at 718). At 720, the workflow includes applying an image registration tool. At 722, the workflow includes applying a transform and identifying pathology in the input image. Identifying pathology in the input image (e.g., an anomaly map) may be driven using the normative data by (a) evaluating a correlation between normative and pathology data and determining regions of low correlation (e.g., correlation below a threshold, such as a threshold based on estimated deviations due to imaging tolerances) as a pathology, and/or (b) subtracting the entire normative volume and corresponding pathology data and thresholding a resulting difference map to determine the anomaly map. An example identification of pathology in the transformed image is shown at 724. For example, applying a transform may include applying a transformation model to perform linear and/or elastic/non-rigid transformations of the synthesized normative data to align to the atlas.

At 726, the workflow includes determining if the transform is successful. A transform may be considered to be successfully applied if the synthesized normative data is determined to exhibit a threshold amount of alignment with the atlas. The success may further be evaluated by maximizing or minimizing cost functions, such as maximizing cross-correlation, maximizing mutual information, and/or minimizing mean square error of the transform. If the transform is successful (e.g., "YES" at 726), the workflow is stopped and a registration between the input image and the atlas may be established. If the transform is not successful (e.g., "NO" at 726), the workflow includes running the registration in a constrained manner for both the pathology regions of the image and the non-pathology regions of the image, as indicated at 728 until the transform is successful. Constraints used for running the registration in a constrained manner include controlling the registration parameters such as gradient smoothing, search radius for metric calculation, diffeomorphic registration velocity field regularizer, scales of registration, order of BSplines registration, etc.

Figure 7:
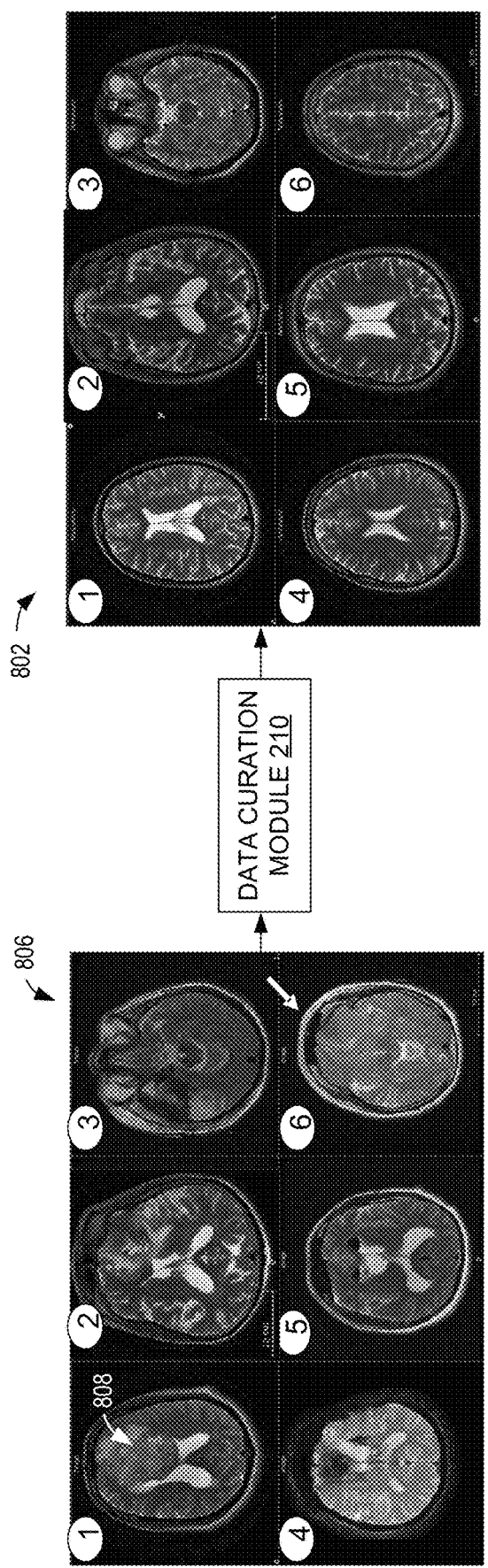
FIG. 7 shows example reference data selections for input anomalous scans of brains using a data curation module.

FIG. 7 shows example output results 802 for a data curation module 210 given a set of input data 806 corresponding to MR scans of human brains. As shown, matching numbers indicate a respective input/output pair for the data curation module 210, however, the results 802 do not represent a one-to-one identical appearance match to the input data 806. Instead, the results 802 are intelligently selected from a group of normal data (that is not associated with the input data 806) by data curation module 210 (using the process described in more detail above with respect to FIGS. 1 and 2) based on overall similarities in or more attributes, wherein attributes may include shape, size, slice depth, tissue structures, anatomical features, etc. for usage as a reference image for generating normative data corresponding to the input data 806. For example, the brain scan of input data 806 labelled as "1" shows a different slice of the brain than the brain scan of input data 806 labelled as "3" (e.g., the brain scan "1" is closer to a top of the head, so the eyes of the patient are not visible, whereas eyes are visible in the brain scan "3"). Accordingly, in order to provide normalized data that replaces the anomaly 808 in brain scan "1" while still maintaining an overall similar appearance to the brain scan "1," the normal output result labelled "1" may be selected for use as a reference image (e.g., applied for use in a generative adversarial network as described above with respect to FIG. 2).

Figure 8:
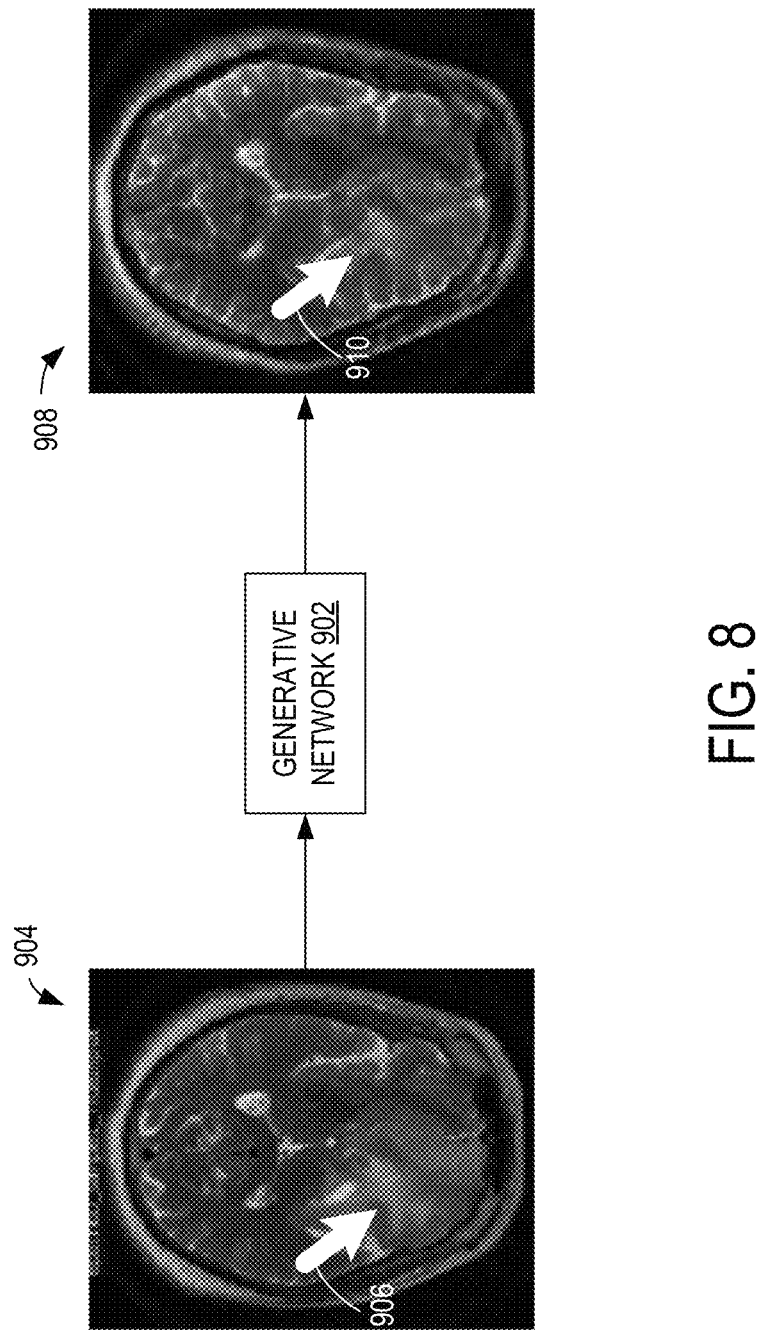
FIG. 8 shows an example normative image generation for an input scan of a brain that includes an anomaly using a generative network.

FIG. 8 shows an example normative image data generation operation for a human brain scan. A generative network 902, which may be an example of the generative network 304 of FIG. 2 in some examples, may accept as input an anomalous MR image 904 of a slice of a brain that includes a tumor indicated by arrow 906. The generative network 902 may output a resulting normative image 908 comprising synthesized data for the brain captured by MR image 904, where the tumor is effectively removed, as shown in the region indicated by arrow 910. Accordingly, while the output normative image 908 may be formed of synthesized data, the synthesized data includes first image data that closely corresponds to the original input data in regions outside of the tumor, and second image data that corresponds to normal brain tissue (e.g., present in one or more reference images, as described above with respect to FIGS. 2-4) in order to replace the tumor with an approximation of normal tissue for the affected region of the brain.

Figure 9:
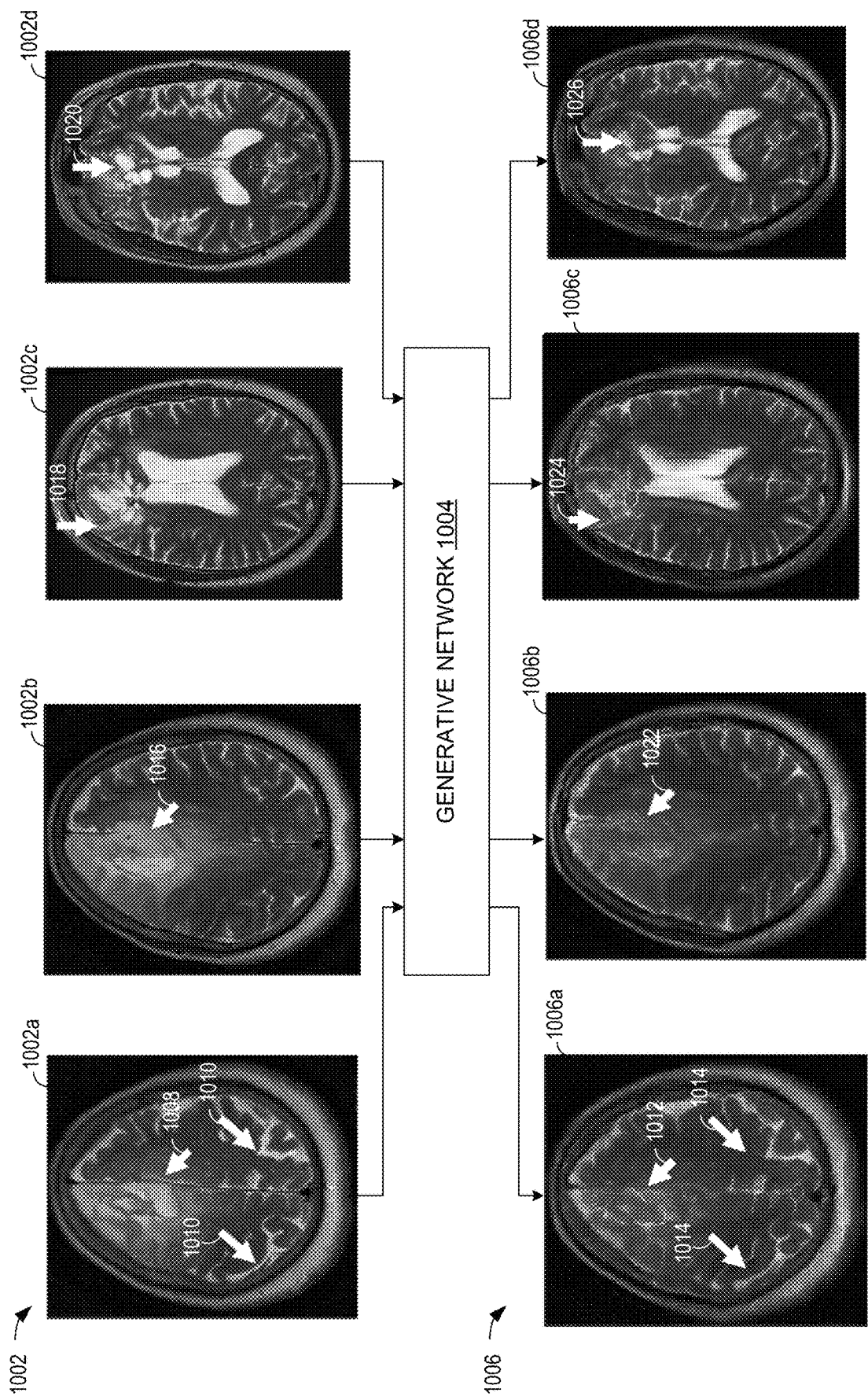
FIG. 9 shows further example normative image generations for corresponding input scans of brains that include an anomaly using a generative network.

FIG. 9 shows a series of example normative image data generation operations for different human brain scans. In each example, a different anomalous MR image 1002 (e.g., 1002a, 1002b, 1002c, 1002d) is provided as input to a generative network 1004, which may be an example of the generative network 304 of FIG. 2. The generative network 1004 may, for each input anomalous image, output a respective resulting normative image 1006 (e.g., 1006a, 1006b, 1006c, 1006d) comprising synthesized data for the associated brain captured by the respective MR image 1002, where the respective anomaly is removed. Accordingly, as described above with respect to FIG. 8, in each example, the output normative image 1006 is formed of synthesized data including data that closely corresponds to non-anomalous regions of the respective input MR image and data that corresponds to normal brain tissue that is provided in place of the anomaly of the respective input MR image.

For example, input anomalous MR image 1002a includes an anomaly (e.g., a tumor) indicated by arrow 1008, as well as otherwise healthy tissue regions indicated by arrows 1010. In the respective output normative image 1006a, the region of the brain that includes the anomaly is populated with synthesized healthy tissue, indicated by arrow 1012. Arrows 1014 indicate regions of the output image that correspond to regions of healthy tissue in the patient, which appear in the output image to be in close correspondence to the associated regions of the input image (e.g., the regions indicated by arrows 1010). In other words, the generative network normalizes the input MR image 1002 such that the region indicated by arrow 1012 of the output image 1006a appears different than the corresponding region of the input image (e.g., replacing anomalous data with synthesized normal data) while the regions indicated by arrows 1014 of the output image 1006a appears similar to the corresponding regions of the input image. In this way, the normative image 1006a normalizes the image data while retaining specificity to the associated patient such that the overall output of the generative network looks similar to the input image.

Similar normalization of anomalies are shown in the respective input/output image pairs 1002b/1006b, 1002c/1006c, and 1002d/1006d. For example, an anomaly is indicated by arrows 1016, 1018, and 1020 in input images 1002b, 1002c, and 1002d, respectively. As shown by arrows 1022, 1024, and 1026 in output images 1006b, 1006c, and 1006d, respectively, the regions corresponding to the anomalies are filled in with synthesized normal brain tissue in order to effectively remove or reduce the appearance of the anomalies in the output images.

Figure 10:
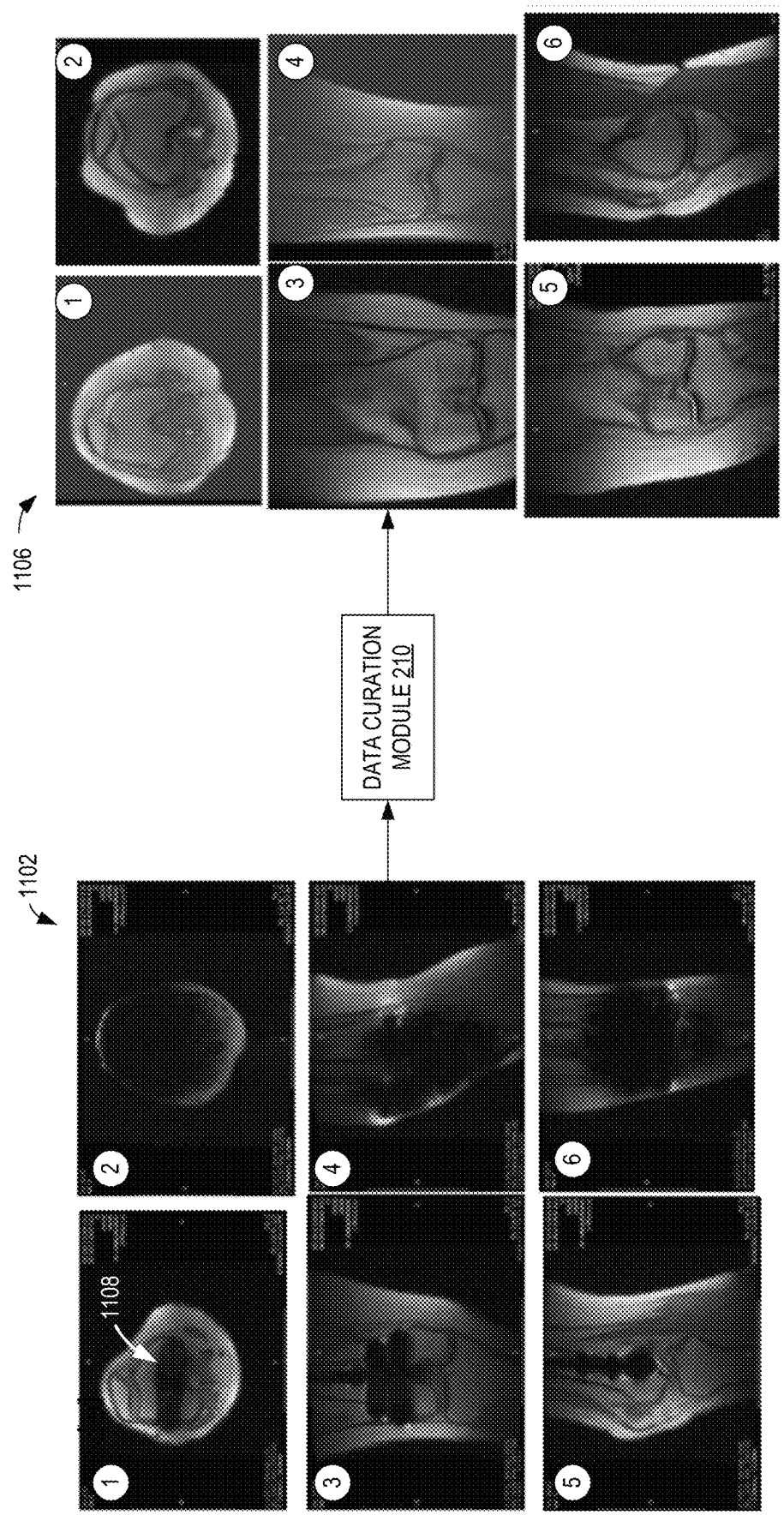
FIG. 10 shows example normative data generation for input anomalous scans of knees using a generative network.

FIG. 10 shows example reference data 1106, selected by data curation module 210 based on a set of input data 1102 corresponding to MR scans of human knees. As shown, matching numbers indicate a respective input/output pair for the data curation module 210, however, the results 1106 do not represent a one-to-one identical appearance match to the input data 1102. Instead, the results 1106 are intelligently selected from a group of normal data (that is, non-anomalous data) by data curation module 210 (using the process described in more detail above with respect to FIGS. 1 and 2) based on overall similarities in one or more attributes, wherein the attributes may include shape, size, slice depth, tissue structures, anatomical features, etc. for usage as a reference image/data for generating normative data corresponding to the input data 1102. For example, the knee scan of input data 1102 labelled as "1" shows a different orientation of the knee than the knee scan of input data 1102 labelled as "3" (e.g., the knee scan "1" shows a horizontal cross section of the knee, while knee scan "3" shows a vertical cross section). Accordingly, in order to provide normalized data that enables a generative network to replace the anomaly 1108 in knee scan "1" while still maintaining an overall similar appearance to the knee scan "1," the reference data labeled "1" in output 1106 may be selected by data curation module 210 for use as a reference image (e.g., applied for use in training a generative adversarial network, as described above with respect to FIG. 2).

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
receiving a medical image;
determining if the medical image includes an anomaly;
responding to the medical image including the anomaly by:
    mapping the medical image to a normative medical image using a generative network of a generative adversarial network (GAN), wherein a region of the normative medical image corresponding to the anomaly comprises synthesized normative data;
    displaying the normative medical image via a display device;
wherein mapping the medical image to the normative medical image using the generative network includes:
learning a plurality of weights for the discriminator network of the GAN using reference data comprising a subset of the plurality of medical images, wherein the subset of the plurality of medical images shares one or more attributes of the medical image;
learning a plurality of weights for the generative network using output from the discriminator network; and
responsive to the plurality of weights for the discriminator network and the plurality of weights for the generative network converging:
    storing the plurality of weights for the discriminator network and the plurality of weights for the generative network in the storage device; and
    mapping the medical image to the normative medical image using the plurality of weights for the generative network.

2. The method of claim 1, wherein the anomaly comprises one or more of a pathology, an image artifact, and an implant.

3. The method of claim 1, wherein mapping the medical image to the normative medical image using the generative network of the GAN comprises:
training a discriminator of the GAN based on the medical image;
training the generative network of the GAN using the trained discriminator;
inputting the medical image into an input layer of the trained generative network of the GAN; and
outputting the normative medical image from an output layer of the generative network.

4. The method of claim 3, wherein training the discriminator of the GAN based on the medical image comprises:
selecting reference data sharing one or more attributes with the medical image; and
training the discriminator of the GAN using the selected reference data.

5. The method of claim 4, wherein the one or more attributes include one or more of an anatomical feature, a shape of the anatomical feature, a gradient of the anatomical feature, and an image contrast.

6. The method of claim 1, the method further comprising:
inputting the normative medical image into an image processing neural network trained via normative data.

7. The method of claim 1, the method further comprising:
registering the normative medical image using a labeled atlas.

8. The method of claim 1, wherein determining if the medical image includes the anomaly includes determining if the medical image includes an anomaly flag.

9. A medical image processing system comprising:
a processor; and
a display device coupled to the processor;
wherein the processor is configured to:
    receive a medical image;
    determine if the medical image includes an anomaly;
    respond to the medical image including the anomaly by:
        mapping the medical image to a normative medical image using a generative network of a generative adversarial network (GAN), wherein a region of the normative medical image corresponding to the anomaly comprises synthesized normative data;
        displaying the normative medical image map via the display device;
wherein mapping the medical image to the normative medical image using the generative network includes:
learning a plurality of weights for the discriminator network of the GAN using reference data comprising a subset of the plurality of medical images, wherein the subset of the plurality of medical images shares one or more attributes of the medical image;
learning a plurality of weights for the generative network using output from the discriminator network; and
responsive to the plurality of weights for the discriminator network and the plurality of weights for the generative network converging:
    storing the plurality of weights for the discriminator network and the plurality of weights for the generative network in the storage device; and
    mapping the medical image to the normative medical image using the plurality of weights for the generative network.

10. The medical image processing system of claim 9, further comprising a storage device storing the generative network and a discriminator network, the storage device further storing a plurality of medical images.

11. The medical image processing system of claim 9, wherein the processor is configured to determine if the medical image includes the anomaly by inputting the image into a classifier, wherein the classifier is configured to classify input images as either anomalous or non-anomalous.

12. The medical image processing system of claim 9, wherein the one or more attributes of the medical image includes an anatomical feature, a contrast, and a slice depth.

13. The medical image processing system of claim 9, wherein the anomaly comprises one or more of a pathology, an image artifact, and an implant.

* * * * *